United States Patent [19]

Stein

[11] Patent Number: 5,238,978
[45] Date of Patent: Aug. 24, 1993

[54] PEROXIDE MASTERBATCHES USING POLYCAPROLACTONE AS THE CARRIER

[75] Inventor: Daryl L. Stein, West Chester, Ohio

[73] Assignee: Elf Atochem North America Inc., Philadelphia, Pa.

[21] Appl. No.: 816,690

[22] Filed: Jan. 2, 1992

Related U.S. Application Data

[63] Continuation-in-part of Ser. No. 420,843, Oct. 13, 1989, abandoned.

[51] Int. Cl.$^5$ ............................................. C08K 5/14
[52] U.S. Cl. ................................. 523/351; 524/100; 524/291; 524/302; 524/303; 524/394; 525/206; 525/387; 525/415
[58] Field of Search ............... 524/100, 291, 302, 303, 524/394; 523/351; 525/415, 387, 206; 568/559, 561; 528/354, 355; 522/24, 79, 146, 166

[56] References Cited

U.S. PATENT DOCUMENTS

| | | | |
|---|---|---|---|
| 3,242,159 | 3/1966 | Kaufman | 260/94.9 |
| 3,523,920 | 8/1970 | Schultz | 260/37 |
| 3,594,342 | 7/1971 | Ratzsch et al. | 260/28.5 |
| 3,652,680 | 3/1972 | Buchholz | 260/609 E |
| 3,772,246 | 11/1973 | Buchholz | 260/45.95 R |
| 3,867,461 | 2/1975 | Leveskis et al. | 568/559 |
| 3,923,947 | 12/1975 | Cook | 264/141 |
| 4,006,283 | 2/1977 | MacKenzie, Jr. et al. | 526/57 |
| 4,342,844 | 8/1982 | Torenbeek et al. | 525/387 |
| 4,366,270 | 12/1982 | Ruter | 523/307 |
| 4,397,992 | 8/1983 | Johansson et al. | 525/305 |
| 4,451,589 | 5/1984 | Morman et al. | 523/124 |
| 4,661,535 | 4/1987 | Borroff et al. | 525/415 |

FOREIGN PATENT DOCUMENTS

| | | |
|---|---|---|
| 0030757 | 6/1981 | European Pat. Off. . |
| 0227048 | 7/1987 | European Pat. Off. . |
| 2382995 | 10/1978 | France . |

OTHER PUBLICATIONS

J. V. Koleske, "Blends Containing Poly($\epsilon$-caprolactone) and Related Polymers" *Polymer Blends,* 2, pp. 369-389 (1978).

*Chemical Additives for the Plastics Industry,* Noyes Data Corporation, Park Ridge, N.J. (1987).

Communication from EPO dated Jun. 26, 1991; the accompanying Search Report and Annex.

*Primary Examiner*—Veronica P. Hoke
*Attorney, Agent, or Firm*—Panitch Schwarze Jacobs & Nadel

[57] ABSTRACT

A masterbatch composition is provided, comprising greater than about 10% to about 70% by weight of organic peroxide homogeneously dispersed in a polycaprolactone carrier. The peroxide masterbatches are safer and easier to store, ship, handle and use than the peroxides from which they are made. The use of the masterbatch compositions to modify a host polymer or resin to which the masterbatch is added is also disclosed.

16 Claims, No Drawings

PEROXIDE MASTERBATCHES USING POLYCAPROLACTONE AS THE CARRIER

CROSS-REFERENCE TO RELATED APPLICATION

This is a continuation-in-part of copending U.S. patent application Ser. No. 07/420,843, filed Oct. 13, 1989 now abandoned.

FIELD OF THE INVENTION

This invention relates to a peroxide masterbatch composition. More specifically, this invention relates to a masterbatch composition comprising one or more organic peroxides homogeneously dispersed in polycaprolactone.

BACKGROUND OF THE INVENTION

Organic peroxides are widely used in the polymer industry to modify various resins such as through grafting reactions, cross-linking reactions, and modification of melt flow, for example. However, by their very nature, peroxides are heat sensitive, degrade quickly and can be dangerous if improperly handled in a concentrated form.

To increase safety and ease of handling, peroxides are often sold as diluted solutions in solvents such as in odorless mineral spirits, or as blends with solid inorganic fillers, such as diatomaceous earth, silica, clays, or calcium carbonate. While these peroxide formulations have their uses, the solvent or filler functions merely to dilute the peroxide. Thus, the solvent and fillers do not enhance the properties of the polymer to be modified by the peroxide formulation.

Another technique for increasing the safety and ease of handling peroxides has been the development of peroxide masterbatches. A masterbatch is a composition in which a compound, such as an organic peroxide, is blended with a carrier, typically a polymer, where the masterbatch polymer is compatible with the polymer or resin to which the masterbatch ultimately will be added (the latter polymer or resin being referred to hereinafter as a "host polymer or resin"). The peroxide or other component added to the carrier in the masterbatch should not react with the carrier so that the peroxide or other component is available for use when the masterbatch is mixed subsequently with the host polymer or resin.

The peroxide or other compound added to the carrier in the masterbatch is present in a concentration considerably higher than the concentration of the compound in the host polymer or resin into which the masterbatch is mixed. The advantages of peroxide masterbatches are that they can be prepared fairly readily, the peroxide is in a fairly stable form, and they are relatively safe and easy to store, ship and handle, particularly since masterbatches typically are formed into pellets or powders for ease of blending with the host polymer or resin to be treated. Furthermore, the masterbatches are formulated by using a polymer in the masterbatch which is identical to or very compatible with the host polymer or resin to be treated to assure good blending and compatibility.

European Patent Application Publication No. 0 227 048 A2, published Jul. 1, 1987, of Albee, Jr., discloses a peroxide masterbatch composition referred to as a peroxide catalyst concentrate. The concentrate is formed by homogeneously blending the peroxide in a polymer composition including at least two thermoplastic or wax polymers in which the combined polymer composition has a melt index of about 250 to about 2500 grams per 10 minutes at 190° C., with an average softening point of about 50° to 115° C., and further in which the melting point range must be broad having at least two melting temperatures at which a substantial portion of the polymer composition melts at each temperature. Polycaprolactone is not one of the polymers mentioned as being suitable for inclusion in the peroxide concentrate composition.

U.S. Pat. No. 3,242,159 of Kaufman discloses a peroxide dispersed into linear polyethylene to form a masterbatch, which in turn is added to more linear polyethylene. The final linear polyethylene is heated to produce a cross-linked polymer. Fillers and additives, except antioxidants, are to be avoided in the cross-linking mixture.

U.S. Pat. No. 3,523,920 of Schultz discloses cross-linked polylactone homopolymers and methods for their preparation. An object of the invention disclosed in this patent is to provide new and useful cross-linked polylactones of improved thermal properties and outstanding solvent resistance. No mention is made whatsoever of any type of masterbatch composition of any sort. The cross-linked polylactones, which may include polycaprolactone, are produced by reacting the polylactones with a free radical forming system to effect cross-linking. Preferred free radical generators include organic peroxides, such as dicumyl peroxide, benzoyl peroxide, acetyl peroxide, 2,4-dichlorobenzoyl peroxide, stearoyl peroxide, di-t-butyl peroxide and t-butyl perbenzoate. Additional fillers can also be added, such as calcium carbonate, metal oxides, silica, neutral or basic carbon blacks, etc.

The cross-linked polylactones of Schultz U.S. Pat. No. 3,523,920 may be cross-linked by using about 0.5% to about 10% by weight of a peroxide (or other free radical initiator) based on the weight of polylactone. The peroxides may be added to the polylactone in a steam-heated rubber mill to mix and compound the peroxide with the polylactone to make an intermediate composition. The intermediate composition is then heated to effect cross-linking, typically after the composition is formed into sheets or other desired shapes.

The present invention, in contrast to Schultz, is not intended to produce cross-linked polycaprolactone, but rather, a masterbatch in which the polycaprolactone is the carrier in the masterbatch composition also including at least one organic peroxide, such that the organic peroxide can be used in subsequent reactions when the masterbatch composition is added to a host polymer or resin. In the present invention, the peroxide of the masterbatch composition does not substantially decompose to initiate the formation of free radicals until the masterbatch is added to or mixed with a host polymer or resin and free radical initiation is commenced intentionally by heating, radiation or other means well known to one skilled in the art. Moreover, the intermediate composition used to make the cross-linked polylactone composition of Schultz U.S. Pat. No. 3,523,920 contains about 0.5% to about 10% of an organic peroxide. However, the present invention contains greater than about of at least one organic peroxide. Thus, the present invention is directed to a composition outside of the range of any of the compositions disclosed in Schultz U.S. Pat. No. 3,523,920. The present invention has a completely different use, namely, as a masterbatch composition in which the peroxide can be safely and stably handled, transported and stored and still be available for subsequent use.

U.S. Pat. No. 3,594,342 of Ratzsch et al. discloses peroxide masterbatches using as carriers copolymers of ethylene and vinyl acetate or ethylene and acrylic esters, with a mean molecular weight of 1200 to 8000. Additives such as dyes, lamp-black and stabilizers may also be included.

U.S. Pat. No. 3,923,947 of Cook discloses a continuous process for preparing cross-linkable polyethylene in an extruder in which a peroxide compound with a flash point of at least 70° C. is dispersed or dissolved in a liquid wax or oil compatible with the polyethylene composition. The dispersion or solution of peroxide is injected into molten polyethylene in a mixing zone at the nose end of the extruder. The hold-up time in the mixing zone is controlled to disperse the peroxide compound in the polyethylene melt uniformly and safely without substantial crosslinking.

U.S. Pat. No. 4,006,283 of MacKenzie, Jr. et al. discloses a method of applying liquid di-t-butyl peroxide to a polyolefin by introducing the peroxide in a vessel below a mass of particulate polyolefin. The polyolefin particles may be added in a batch to the vessel and initially treated with the peroxide. This is followed by the prompt addition of another or remaining batch of polyolefin particles and additional curing agent.

U.S. Pat. No. 4,342,844 of Torenbeek et al. describes coating polymer particles, such as polyethylene, with a liquid peroxide medium. The liquid medium comprises about 2-100% of a peroxide which is a liquid at about 15°-95° C. and 0-98% of a liquid in which the peroxide and the polymer are insoluble. A polymer masterbatch in which essentially all of the polymer particles are completely surrounded by the peroxide liquid medium is obtained.

U.S. Pat. No. 4,366,270 of Rüter discloses a process for incorporating additives into thermoplastic synthetic resins by forming a masterbatch including the additives carried in a polymerizable cyclic ester, which may be unpolymerized or polymerized before being added to the synthetic resin. The polymerizable cyclic ester may be caprolactone, such that when polymerized, the carrier may be polycaprolactone. The types of additives to be contained in the masterbatch are generally referred to as "customary additives for synthetic resins." There is no disclosure of the use of any organic peroxide as a component of the masterbatch composition. Rather than being customary additives which are retained in synthetic resins, organic peroxides are free radical initiators which are typically dissipated, decomposed or consumed in synthetic resins.

U.S. Pat. No. 4,397,992 of Johansson et al. discloses a peroxide masterbatch in which the carrier is a multistage graft copolymer comprising 70-90% of a hard portion made by graft polymerizing a monomer or monomers of lower alkyl methacrylates, styrene and mixtures thereof and a cross-linking agent onto 10-30% of a rubbery portion made by polymerizing a butadiene and/or lower alkyl crylate or a mixture of styrene and butadiene or acrylonitrile and butadiene. Optional reinforcing agents or fillers may be included.

U.S. Pat. No. 4,451,589 of Morman et al. discloses a peroxide masterbatch wherein an organic peroxide is mixed at high temperatures in extruders with carrier polymers and copolymers of propylene and butylene. More than half of the polymer and more than 0.01% of the peroxide remains unreacted after the masterbatch is initially pelletized.

A masterbatch of peroxide dispersed onto a filler is described in a Material Safety Data Sheet covering LUPERCO TM 101-P20 which is produced by the Organic Peroxides Division of Atochem North America, Inc. (formerly the Lucidol Division of the Pennwalt Corp.). Basically, this masterbatch consists of 2,5-dimethyl-2,5-di-(t-butylperoxy)hexane, silica, and polypropylene powder.

A masterbatch of peroxide dispersed onto a polymer is also described in a Material Safety Data Sheet covering LUPERCO TM 101-A5, also produced by the Organic Peroxides Divison of Atochem North America, Inc. (formerly the Lucidol Division of the Pennwalt Corp.). This masterbatch consists of 5% 2,5-dimethyl-2,5-di-(t-butylperoxy)hexane on acetal resin (formaldehyde homopolymer).

Nowhere in the prior art is the use of polycaprolactone as a carrier for organic peroxides mentioned or suggested. Nor is it mentioned that the carrier polymer itself of a peroxide-containing masterbatch can be used to improve upon the properties of the host resin to which the masterbatch is to be added.

SUMMARY OF THE INVENTION

The present invention relates to a masterbatch composition comprising greater than about 10% to about 70% of organic peroxide homogeneously dispersed in a polycaprolactone carrier.

In addition, the present invention relates to a method of modifying a polymer comprising adding to the polymer about 0.1% to about 50% of the foregoing peroxide-polycaprolactone masterbatch composition.

DEFINITIONS

As used herein with respect to the masterbatch in relation to the host polymer or resin, "compatible" means that the masterbatch is readily dispersed into the host polymer or resin into which the masterbatch is to be added with no obvious "sweat-out" or substantial deterioration in physical properties of the masterbatch or host polymer combined with the masterbatch. As used herein with respect to the components of the masterbatch itself, "compatible" means that the component is readily dispersible within the polycaprolactone or the other components of the masterbatch without substantial chemical reactions occurring among the components and the polycaprolactone, without "sweating out" or "oiling out" of the components and without substantially adversely affecting the physical or chemical properties of the masterbatch.

As used herein, the term "percent" or "%" of a component in a composition means percent by weight of the component based on the weight of the composition containing the component unless otherwise indicated by the context in which the term is used.

As used herein, "substantial decomposition" with respect to the effect of additives to the masterbatch means that greater than about 25% of the peroxide component in the masterbatch would be decomposed.

DETAILED DESCRIPTION OF THE PREFERRED EMBODIMENT

As stated above, this invention concerns a composition of organic peroxide masterbatches in which polycaprolactone is the carrier. In accordance with the present invention, not only are the advantages of a peroxide masterbatch obtained with respect to the convenient and safe handling and processing of peroxide compounds, but also, the use of polycaprolactone as a carrier provides additional advantages not recognized by prior art peroxide masterbatch compositions.

Polycaprolactone has uses as described in D. R. Paul and Newman, Eds., *Polymer Blends*, Vol. 2, 369–389, Academic Press, 1978, the disclosure of which is hereby incorporated herein by reference. Polycaprolactone is a partially crystalline polymer with a melting point of 60° C. This relatively low melting point is an important consideration when trying to compound it into heat sensitive peroxides. Polycaprolactone is nonvolatile so as not to be lost either during polymer processing or end use. Its most important physical property is its compatibility with a wide variety of polymers, which means polycaprolactone serves as a polymeric plasticizer for many of them. It has also been used to improve dyeability, stress crack resistance, and static charge resistance of many polymers. When combined with natural and synthetic rubbers which were then cross-linked, polycaprolactone blends with improved processability, additive acceptance and strength have been obtained. Thus, polycaprolactone in its own right can improve upon many physical properties of the polymers into which it is blended.

Based on the present invention, a masterbatch of an organic peroxide and polycaprolactone (and other optional additives) can be used to modify physical or chemical properties of a host resin into which the masterbatch has been added. Thus, the peroxide is in a safe, convenient form and both the peroxide and the polycaprolactone carrier can modify the host resin advantageously. Such modification may include, for example, the selective reduction of the host polymer's molecular weight or the modification of polymer molecular weight distribution. In addition, the peroxide is available for chemical modification, such as the chemical reaction with the host polymer or resin, for example, cross-linking, curing, polymerizing and grafting, etc.

The peroxide-polycaprolactone masterbatch optionally may contain various other additives typically used with polymer systems. While these will be described in more detail hereinafter, such optional additives generally include inorganic fillers, antioxidants, antiozonants, antistatic agents, dyes, pigments, fire retardants, fluorescent brighteners, light stabilizers, cross-linking enhancers, and mixtures thereof.

It is also optional that two or more different kinds of organic peroxides with different decomposition temperatures may be present in the masterbatch. The advantage of having masterbatches containing peroxides with different decomposition temperatures is that the masterbatches could be used for sequential grafting, cross-linking, or other polymer modification reactions.

Organic peroxides suitable for use in the peroxide-polycaprolactone masterbatch composition of the present invention are any organic peroxides which can be used in grafting reactions, cross-linking reactions or modification of melt flow of various polymers comprising the host resins with which the masterbatch will be blended. Any organic peroxide that can be mixed with polycaprolactone without substantial chemical reaction resulting from decomposition of the organic peroxide may be used. It is preferred that there be no chemical reaction, such as cross-linking reactions, involving the polycaprolactone of the masterbatch composition. Such reactions may result from the decomposition of the peroxide, resulting in the formation of free radicals. Such decomposition in the masterbatch per se is to be avoided to the extent practicable, so that the peroxide is available for free radical formation when the masterbatch is used by being added to or mixed with a host polymer or resin.

In order to have a masterbatch that does not require refrigerated storage, it is preferred to use solid peroxides which have a melting point greater than about 30° C. and a ten hour half life temperature greater than about 45° C., and liquid peroxides which have a freezing point less than about 30° C. and a ten hour half life temperature greater than about 75° C. It is presently more preferred to use solid peroxides which have a melting point greater than about 35° C. and a ten hour half life temperature greater than about 49° C., and liquid peroxides which have a freezing point less than about 35° C. and a ten hour half life temperature greater than about 90° C. If solid (or liquid) peroxides are used which have a melting (or freezing) point and a ten hour half life temperature that are less than the preferred range, then refrigerated storage of the masterbatch will be required.

In the book *Chemical Additives for the Plastics Industry Properties, Applications, Toxicologies*, by Radian Corporation, Noyes Data Corporation Publisher (1987), herein referred to as "*Chemical Additives*," many organic peroxides are described on pages 279–284, which meet these thermal stability requirements. These disclosures are hereby incorporated herein by reference. Some of the preferred peroxides mentioned are, by way of example and not limitation, alpha,alpha'-bis-(t-butylperoxy)diisopropylbenzene, t-butyl cumyl peroxide, dicumyl peroxide, 2,5-dimethyl-2,5-bis-(t-butylperoxy)-hexane, 2,5-dimethyl-2,5-bis-(t-butylperoxy)hexyne-3, di-t-butyl peroxide, benzoyl peroxide, OO-t-butyl-O-isopropyl monoperoxycarbonate, OO-t-butyl-O-(2-ethylhexyl) monoperoxycarbonate, t-butyl peroxyacetate, t-butyl peroxybenzoate, di-t-butyl diperoxyphthalate, di-t-butyl peroxyazelate, t-butylperoxy-2-ethylhexanoate, t-butyl peroxyisobutyrate, n-butyl-4,4-di-(t-butylperoxy)valerate, succinic acid peroxide, t-butylperoxy maleic acid, 1,1-di-(t-butylperoxy)cyclohexane, 1,1-di-(t-butylperoxy)-3,3,5-trimethylcyclohexane, 2,2-di-(t-butylperoxy)butane, ethyl 3,3-di-(t-butylperoxy)-butyrate, t-amyl perbenzoate, t-amyl peroxy(2-ethylhexanoate), and 1,1-di-(t-amylperoxy)cyclohexane.

Other peroxides that are not mentioned in the reference but which may be used in this invention are, for example, 2-(t-butylperoxy)-2-methyl-4-hydroxypentane, di-2-(t-butylperoxy)-2-methyl-4-pentyl] carbonate, di-[2-(t-butylperoxy)-2-methyl-4-pentyl] terephthalate, di-[2-(t-butylperoxy)-2-methyl-4-pentyl ] isophthalate, 4-hydroxy-2-methyl-2-pentyl peroxy-2-methylbenzoate, 4-hydroxy-2-methyl-2-pentyl peroxyacetate, di-t-amylperoxide, 2,2-di-(t-amylperoxy)propane, ethyl 3,3-di-(t-amylperoxy)butyrate, 2,5-dimethyl-2,5-di-(t-amylperoxy)hexane, and OO-t-amyl-O-(2-ethylhexyl)-monoperoxycarbonate.

The peroxides may be present in the masterbatch in an amount of greater than about 10% to about 70%. Preferably, the peroxide or combination of peroxides are present in the masterbatch in an amount of more than 11% to about 50%. It is presently more preferred that the peroxide or combination of peroxides are present in an amount of about 12% to about 25%. The amount of peroxide contained in the masterbatch is dependent upon the ultimate use intended for the masterbatch, including the type of peroxide used, the type and intended use of the host polymer or resin into which the masterbatch is incorporated, and other factors well known to those skilled in the art. Generally, it is preferred that if optional additives are included in the masterbatch along with the peroxide or peroxides and the polycaprolactone, the total peroxide and additive components not exceed 95%, and, preferably, 85% of the weight of the masterbatch composition.

The molecular weight of the polycaprolactone may be any value between 500 and 100,000, and preferably is between 10,000 and 50,000. Examples of commercial grades of polycaprolactone are TONE TM 300 (M. W. ca. 15,000) and TONE TM 700 (M. W. ca. 40,000) which are produced by the Union Carbide Corp.

Other optional additives that may be added either individually or in any combination to the peroxide-polycaprolactone masterbatch are the following types of typical additives to polymer systems:

(a) Inorganic Fillers. Non-limiting examples of fillers are described in *Chemical Additives*, pp. 256–261, and are hereby incorporated herein by reference. Some preferred examples are diatomaceous earth, kaolin clay, calcium carbonate, glass fibers, magnesium oxide, silica, talc, and zinc oxide.

(b) Antioxidants and Antiozonants. Non-limiting examples are described in *Chemical Additives*, pp. 153–163, and are hereby incorporated herein by reference. Preferred antioxidants are hindered phenols, organosulfur compounds, organophosphorous compounds, and aromatic amines. Some preferred examples are butylated hydroxytoluene, hexamethylenebis(3,5-di-t-butyl-4-hydroxycinnamate), 4-octadecyl 3,5-di-t-butyl-4-hydroxyhydrocinnamate, tetrakis[methylene(3,5-di-t-butyl-4-hydroxyhydrocinnamate)]methane, tris(2,4-di-tbutylphenyl)phosphite, and dilauryl thiodipropionate. Other preferred sulfur based antioxidants that are not listed in the reference are disclosed in U.S. Pat. Nos. 3,772,246 and 3,652,680, hereby incorporated herein by reference.

(c) Antistatic Agents. Non-limiting examples are described in *Chemical Additives*, pp. 164–174, and are hereby incorporated herein by reference. Preferred antistatic agents are aliphatic amines, quaternary ammonium compounds, organophosphates, and polyethers. Examples of preferred antistatic agents are 2,2'-(octadecylimino)bisethanol, alpha-dodecyl-omega-hydroxy-poly(oxy-1,2-ethanediyl)phosphate, polyethyleneglycol monodecyl ether, and (3-lauramidopropyl)-trimethylammoniummethyl sulfate.

(d) Pigments, Dyes, and Optical Brighteners. Non-limiting examples are described in *Chemical Additives*, pp. 194–223, and are hereby incorporated herein by reference. Examples of preferred dyes, pigments, and optical brighteners are titanium dioxide, zinc oxide, zinc sulfide, and carbon black.

(e) Heat Stabilizers. Non-limiting examples are described in *Chemical Additives*, pp. 290–342, and are hereby incorporated herein by reference. Examples of preferred heat stabilizers are magnesium stearate, calcium stearate, di-n-octyltin S,S-bis(isooctyl mercaptoacetate), di-n-octyltin bis(2-ethylhexyl maleate), dibasic lead phosphate, and lead salicylate.

(f) Ultraviolet Stabilizers. Non-limiting examples are described in *Chemical Additives*, pp. 440–446, and are hereby incorporated herein by reference. Preferred ultraviolet stablizers are 2-hydroxybenzophenones, 2-(2-hydroxyphenyl)benzotriazoles, cyanoacrylates, organonickel compounds, benzylidene malonates, oxalanilides, phenyl salcilates, and hindered amines. Examples of preferred ultraviolet stabilizers are 2-hydroxy-4-n-octyloxybenzophenone, 2-(2'-hydroxy-5'-methylphenyl)benzotriazole, 2-(2'-hydroxy-5'-t-octylphenyl)-benzotriazole, ethyl 2-cyano-3,3-diphenylacrylate nickel dibutyldithiocarbamate, dimethyl-2-(4-methoxybenzylidene)malonate, 2-ethyl-2'ethoxy-oxalanilide, and bis-(2,2,6,6-tetramethyl-4-piperdinyl)sebacate.

(g) Fire Retardants. Non-limiting examples are described in *Chemical Additives*, pp. 268–278, and are hereby incorporated herein by reference. Preferred fire retardants are inorganic compounds, halogenated organic compounds, and phosphorous compounds. Examples of preferred fire retardants are alumina trihydrate, antimony trioxide, decabromodiphenyl ether, hexabromocyclodecane, and triisopropyl phenyl phosphate. An additional preferred fire retardant is di-(2-ethylhexyl)-3,4,5,6-tetrabromophthalate.

(h) Cross-linking enhancer co-agents (compounds which enhance the cross-linking effectiveness of a peroxide). Non-limiting examples of preferred co-agents are triallyl isocyanurate, triallylcyanurate, triallyl trimellitate, diallyl phthalate, diallyl carbonate, diallyl oxalate, bis(2-methacryloxyethyl) terephthalate, and 1,4-butylene glycol diacrylate.

It should be noted that the invention is not limited to the examples given in the above references, but it is to include all peroxides and polymer additives known in the art, provided that it must be possible to mix the peroxide and additive into polycaprolactone without substantial chemical reaction in the masterbatch resulting from peroxide decomposition, and that the peroxide and additives show reasonable compatibility with polycaprolactone in the desired composition range.

The amount of the optional additives to be included in the masterbatch compositions of the present invention are well known to those skilled in the art and may be easily determined without undue experimentation, depending on the type of additive, the nature and purpose of the additive and the type and purpose of the host polymer resin into which the masterbatch is to be blended. Typically, the amount of optional additives that may be blended into the masterbatch may be in any ratio to each other and to the organic peroxide(s) and in any amount of about 0.1% to less than 84%, so long as the total amount of peroxide plus optional additives does not exceed about 95% of the masterbatch composition. This results in at least 5% polycaprolactone in the masterbatch composition. More preferably, the amount of optional additives may be any amount between about 0 1% and about 74%, so long as the total amount of peroxide plus optional additives does not exceed about 85%

The peroxide and any optional additives may be homogeneously dispersed in or blended with the polycaprolactone using any method known in the art that is used to mix a compound into a polymer. Examples of such methods are:

(1) melt the polycaprolactone, add the peroxide, stir and cool;

(2) add the polycaprolactone and peroxide to a melt mixer, such as a Brabender;

(3) mix the polycaprolactone and peroxide with a roll mill;

(4) dissolve the polycaprolactone and peroxide into a solvent and then, optionally, to remove the solvent;

(5) mix the polycaprolactone and peroxide together using an extruder; and (6) dry blend polycaprolactone powder or granules with a peroxide.

The temperatures used to carry out the mixing may be any temperatures between about 0° C. and about 150° C., preferably between about 20° C. and about 100° C. The temperature of mixing depends upon the thermal stability of the peroxide or peroxides to be blended into the masterbatch, and the temperature of mixing should be such that substantial decomposition of the peroxide(s) does not occur.

As explained above, with the present invention, substantially all, and preferably all, of the organic peroxide(s) of the masterbatch is not decomposed while in the masterbatch composition until the masterbatch composition is mixed with a host polymer or resin, at which time substantially all, and preferably all, of the organic peroxide(s) from the masterbatch composition is available for initiating free radical formation and reaction with the host polymer or resin with which the masterbatch composition is used.

The final form of the masterbatch depends upon the combination of materials used and the needs of the end user. The final form may be a liquid or solid, and if a solid, usually in the form of flakes, granules, pellets, or powder.

The polymers of a host resin which the masterbatch may be used to modify in some desirable way are those polymers which display compatibility with polycaprolactone. A non-limiting list of such polymers includes, for example, polyethylene, polypropylene, poly(vinyl chloride), poly(vinyl chloride-co-vinylidene chloride), acrylonitrile-butadiene-styrene copolymers (ABS), poly(vinyl acetate), nitrocellulose, poly(styrene-co-acrylonitrile), poly(vinyl butyral), poly(vinyl formal), poly(styrene-co-methyl methacrylate), cellulose tridecanoate, poly(ethylene oxide), polycaprolactam, poly(ethyl vinyl ether-co-maleic anhydride), polybutadiene, polyisobutylene, natural gum rubber, poly(styrene-co-butadiene), poly(ethylene-co-propylene) terpolymer, butyl rubber gum, styrene unsaturated polyesters, poly(ethyl vinyl ether), epoxy resins, and phenol formaldehyde polymers.

The masterbatch may be used in any amount between about 0.1% and about 50% in the host resin. Where the host resin is polycaprolactam, the masterbatch should be used in an amount not exceeding about 10%.

In order to further illustrate the invention, experiments set forth in the following examples were carried out. However, the examples are not meant to limit the scope of the invention in any way.

EXAMPLE 1

Preparation of Peroxide-Polycaprolactone Masterbatches

A three necked flask was fitted with nitrogen inlet line, a mechanical stirrer, and a thermometer. The flask was charged with 40.0g of TONE ™ 300 (polycaprolactone, M. W. 15,000, from Union Carbide Corp.) and the flask was purged with nitrogen. The polymer was melted by heating the flask in a 90° C. oil bath. Once all the polymer had melted, a measured amount of a peroxide was added as indicated in Table 1. The mixture was then vigorously stirred for five minutes with the melt temperature being held between 75°-80° C. The molten polymer mixture was poured into a bottle, and after cooling, a white waxy solid was obtained.

Peroxide-polycaprolactone masterbatches prepared in this manner have the peroxide type and content set forth in Table 1.

TABLE 1

Peroxide-Polycaprolactone Masterbatches Using Various Peroxides

| Peroxide | Amount Added (grams) | Weight % Expected |
|---|---|---|
| 1. LUPERSOL ™ 101[1] | 5.5 | 10.9[4] |
| 2. LUPEROX ™ 500R[2] | 10.0 | 20.0 |
| 3. LUPERSOL ™ 231[3] | 11.0 | 20.2[5] |

[1]90.3% 2,5-dimethyl-2,5-di-(t-butylperoxy)hexane produced by the Organic Peroxides Division of Atochem North America, Inc.
[2]99% dicumyl peroxide produced by the Organic Peroxides Division of Atochem North America, Inc.
[3]92% 1,1-di-(t-butylperoxy)-3,5,5-trimethylcyclohexane produced by the Organic Peroxides Division of Atochem North America, Inc.
[4]found 10.6% peroxide.
[5]found 20.7% peroxide.

The above results demonstrate that organic peroxides can be blended into molten polycaprolactone without substantial peroxide decomposition.

EXAMPLE 2

Preparation of Peroxide-Polycaprolactone Masterbatch with Antioxidant Additives

A three necked flask was fitted with a nitrogen inlet line, a mechanical stirrer, and a thermometer. The flask was charged with 112.5 g of Tone ™ 300, 2.25 g of Irganox ™ 1010 (tetrakis[methylene(3,5-di-t-butyl-4-hydroxy-hydrocinnamate)]methane antioxidant from Ciba-Geigy), and Irgafos ™ 168 (tris(2,4-di-t-butylphenyl)-phosphite antioxidant from Ciba-Geigy). The flask was purged with nitrogen and was heated in an oil bath until the melt temperature of the polymer reached 80°-90° C. Then 1.0 g of 90.3% LUPERSOL ™ 101 was added, and the stirring was continued for another 2-3 minutes. The molten polymer was then poured into a bottle and allowed to cool to room temperature to form a white solid. Later the solid was broken up into small granules using a mortar and pestle. Analysis of the composition by gas chromatography showed that it contained 0.6% LUPERSOL ™ 101, whereas 0.76% was I0 the expected value by calculation. The above results show that it is possible to prepare a peroxide-polycaprolactone masterbatch which also contains antioxidants without substantial decomposition of the peroxide.

EXAMPLE 3

Preparation of a Peroxide-Polycaprolactone Masterbatch With Antioxidants and Hindered Amine Light Stabilizer Additives The procedure was carried out as described in Example 2 except that 6.75g of Tinuvin ™ 770 (bis-(2,2,6,6-tetramethyl-4-piperidinyl)sebacate light stabilizer from Ciba-Geigy) was also added. Analysis of the composition by gas chromatography indicated that it contained 0.7% LUPERSOL ™ 101 whereas 0.73% was expected by calculation. The above results show that it is possible to prepare a peroxide-polycaprolactone masterbatch which contains antioxidants and a UV light stabilizer without substantial decomposition of the peroxide.

Although specific preparations have not been made of peroxide-polycaprolactone masterbatches with and without optional additives other than as set forth in Examples 1 through 3, these Examples clearly demonstrate appropriate techniques for forming peroxide-polycaprolactone masterbatches containing any desired type and amount of peroxide within the ranges set forth herein. Thus, for example, based on the present disclosure and following the procedures of Examples 1 through 3, without undue experimentation, one could readily produce peroxide-polycaprolactone masterbatches containing greater than about 10% of peroxide to about 70% peroxide, within the broad range set forth above; masterbatches containing more than 11% to about 50% peroxide, within the preferred range set forth above; and masterbatches containing about 12% to about 25% peroxide, within the presently more preferred range set forth above. More particularly, one skilled in the art could readily produce peroxide-polycaprolactone masterbatches containing about 12%, about 13%, about 14%, about 15%, about 16%, about 17%, about 18%, about 19%, about 20%, about 21%, about 22%, about 23%, about 24% or about 25%, or any fractional amounts within any of the disclosed ranges. Following the procedures disclosed herein, one would expect there to be no substantial reaction, such as cross-linking reactions, in the masterbatch compositions resulting from decomposition of the peroxide. Thus, one would expect that all of or at least substantially all of the peroxide within the masterbatch is available for subsequent use when the masterbatch is added to a host polymer or resin.

The following examples demonstrate the use of masterbatch compositions of the present invention and provide some comparative data showing the beneficial results associated with the present invention.

EXAMPLE 4

Modification of Polypropylene With Masterbatches Containing Peroxide or Polycaprolactone To a Brabender mixer set at 190° C. and 30 rpm was added the amount of polypropylene (grade 6501 from Himont) indicated in Tables 2 and 3. When the resin temperature reached 180° C., the appropriate amount of masterbatch indicated in Tables 2 and 3 was added in one portion, and the blending continued for 5-6 minutes. The resin was removed, cooled to room temperature, and ground in a laboratory grinder. The melt flow of the ground samples was measured with a Tinius Olsen Extrusion Plastometer (ASTM 1238, Condition L). The results are set forth in Tables 2 and 3.

COMPARATIVE EXAMPLE A

Preparation of a Polycaprolactone Antioxidant Masterbatch

The procedure was carried out as described in Example 2 except that no peroxide was added. This example is for comparative purposes and is not part of the invention.

COMPARATIVE EXAMPLE B

Modification of Polypropylene Using a Polypropylene-Peroxide Masterbatch

A dry blend of polypropylene and antioxidants indicated in Tables 2 and 3 were mixed in the Brabender mixer and heated to 180° C. as described in Example 4. A polypropylene-peroxide masterbatch was prepared by mixing with a spatula at room temperature the appropriate amount of peroxide into a 20g portion of fresh polypropylene powder. This masterbatch was added to the fluxing resin in the Brabender mixer in one portion. After being mixed for 5-6 minutes, the resin was removed from the mixer, and the samples were prepared as described in Example 4. The results are set forth in Tables 2 and 3.

COMPARATIVE EXAMPLE C

Compounding of Antioxidants only into Polypropylene

The amount of antioxidants indicated in Tables 2 and 3 were dry blended into polypropylene powder, which was then added to the Brabender mixer as described in Example 4. Test specimens were also prepared as described in Example 4, and the results are set forth in Tables 2and Table 3.

TABLE 2

Modification of Polypropylene With and Without Masterbatches Containing Peroxides or Polycaprolactone

| Masterbatch (grams) | PP[1] (grams) | PCL[2] (wt %) | Peroxide[3] (wt %) | AO-1[4] (wt %) | AO-2[5] (wt %) | HALS[6] (wt %) |
|---|---|---|---|---|---|---|
| Ex. 2 (11.8) | 213.2 | 5.0 | 0.04 | 0.1 | 0.1 | — |
| Ex. 3 (12.5) | 212.5 | 5.0 | 0.04 | 0.1 | 0.1 | 0.3 |
| Comp. Ex. A (11.7) | 213.3 | 5.0 | — | 0.1 | 0.1 | — |
| Comp. Ex. B | 224.4 | — | 0.04 | 0.1 | 0.1 | — |
| Comp. Ex. C | 224.5 | — | — | 0.1 | 0.1 | — |

[1]Total amount of polypropylene added to the mixer in one run.
[2]Total amount of polycaprolactone added from the masterbatch.
[3]Total amount of LUPERSOL ™ 101 added, either from the masterbatch or directly.
[4]Total amount of Irganox ™ 1010 added, either from the masterbatch or directly.
[5]Total amount of Irgafos ™ 168 added, either from the masterbatch or directly.
[6]Total amount of Tinuvin ™ 770 added from the masterbatch.

TABLE 3

Test Results for the Modified Polypropylene Samples With and Without Masterbatches

| Masterbatch or Control Used | Melt Flow (g/10 min) |
|---|---|
| Example 2 | 20.5 |
| Example 3 | 25.3 |
| Comp. Ex. A | 5.2 |
| Comp. Ex. B | 9.1 |
| Comp. Ex. C | 3.3 |

As the data in the examples and the tables clearly show, a peroxide-polycaprolactone masterbatch when used to modify polypropylene leads to a material with an improved melt flow (Examples 2 and 3) when compared with samples that were not modified using a peroxide-polycaprolactone masterbatch (Comparative Examples A, B and C). Moreover, there appears to be a synergistic effect when a hindered amine is added to the masterbatch, as can be seen from the polypropylene sample modified using the masterbatch of Example 3, which showed the highest melt flow of all the samples.

EXAMPLE 5

Addition of Peroxide-Polycaprolactone Masterbatch to Polypropylene Powder

A suitable container was charged with 213.2 g of polypropylene powder (grade 6501 from Himont) and 11.8 g of the masterbatch formulation of Example 2, which had been ground to a powder and sieved through a 16 mesh screen. The mixture was added to a plastic container which then was sealed and vigorously shaken to thoroughly mix the components of the masterbatch.

Based on the weights of the ingredients, the mixture contained 5% polycaprolactone, 0.04% LUPERSOL ™ 101, and 0.1% each of Irganox ™ 1010 and Irgafos ™ 168.

EXAMPLE 6

Addition of Peroxide-Polycaprolactone Masterbatch to Polypropylene Powder

A sample of 212.5 g of polypropylene and 12.5 g of the masterbatch of Example 3 were dry blended as described in Example 5. In addition to the ingredients of Example 5, this sample also contained 0.3% Tinuvin ™ 770.

COMPARATIVE EXAMPLE D

Addition of Antioxidants and Peroxide to Polypropylene Powder

To a sample of 224.45 g of polypropylene powder (grade 6501 from Himont) were added 0.225 g (0.1%) of Irganox ™ 1010, 0.225 g (0.1%) of Irgafos ™ 168, and 0.105g (0.04%) of 90.3% LUPERSOL ™ 101. The mixture was then vigorously dry blended together as in the procedure of Example 5.

COMPARATIVE EXAMPLE E

Addition of Antioxidants to Polypropylene Powder

To a sample of 224.54 g of polypropylene powder (grade 6501 form Himont) were added 0.23 g (0.1%) of Irganox ™ 1010 and 0.23 g (0.1%) of Irgafos ™ 168. The mixture was vigorously dry mixed as in the procedure of Example 5.

EXAMPLE 7

Modification of Polypropylene With and Without Peroxide-Polycaprolactone Masterbatches in an Extruder The polypropylene formulations of Examples 5 and 6 and Comparative Examples D and E were extruded using a ⅜ inch Killion laboratory single screw extruder 1/d ratio 24/1 at 200°–205° C. The rpm was set at 15–16, and the measured extrusion rate was about 6 g/min. The results of this work are set forth in Table 4.

TABLE 4

Results for the Modification of Polypropylene With and Without Peroxide-Polycaprolactone Masterbatches in an Extruder

| Polypropylene Blend Used | Melt Flow (g/10 min)[1] |
|---|---|
| Example 5 | 26.1 |
| Example 6 | 31.2 |
| Comp. Ex. D | 24.7 |
| Comp. Ex. E | 2.3 |

[1]ASTM Test Method 1238, condition L.

The results in Table 4 show that the peroxide-polycaprolactone masterbatches (Examples 5 and 6) provide increased melt flow over both of the comparative examples. Moreover, as can be seen from the results of Example 6, there is a synergistic effect to the modification of the melt flow when a hindered amine is added to the masterbatch.

The present invention may be embodied in other specific forms without departing from the spirit or essential attributes thereof and, accordingly, reference should be made to the appended claims, rather than to the foregoing specification as indicating the scope of the invention.

I claim:

1. A masterbatch composition comprising greater than about 10% to about 70% of organic peroxide homogeneously dispersed in a polycaprolactone carrier.

2. The masterbatch composition of claim 1 wherein the organic peroxide is selected from the group consisting of solid peroxides which have a melting point greater than about 30° C. and a ten hour half life temperature greater than about 45° C., and liquid peroxides which have a freezing point less than about 30° C. and a ten hour half life temperature greater than about 75° C.

3. The masterbatch composition of claim 2 wherein the organic peroxide is selected from solid peroxides which have a melting point greater than about 35° C. and a ten hour half life temperature greater than about 49° C., and liquid peroxides which have a freezing point less than 35° C. and a ten hour half life temperature greater than about 90° C.

4. The masterbatch composition of claim 1 wherein the organic peroxide is selected from a group consisting of alpha,alpha'-bis-(t-butylperoxy)di-isopropylbenzene, t-butyl cumyl peroxide, dicumyl peroxide, 2,5-dimethyl-2,5-bis-(t-butylperoxy)hexane, 2,5-dimethyl-2,5-bis-(t-butylperoxy)hexyne-3, di-t-butyl peroxide, benzoyl peroxide, OO-t-butyl-O-isopropyl monoperoxycarbonate, OO-t-butyl-O-(2-ethylhexyl) monoperoxycarbonate, t-butyl peroxyacetate, t-butyl peroxybenzoate, di-t-butyl diperoxyphthalate, di-t-butyl peroxyazelate, t-butylperoxy-2-ethylhexanoate, t-butyl peroxyisobutyrate, n-butyl-4,4-di-(t-butylperoxy)valerate, succinic acid peroxide, t-butylperoxy maleic acid, 1,1-di-(t-butylperoxy)cyclohexane, 1,1-di-(t-butylperoxy)-3,3,5-trimethylcyclohexane, 2,2-di-(t-butylperoxy)butane, ethyl 3,3-di-(t-butylperoxy)butyrate, t-amyl perbenzoate, t-amyl peroxy(2-ethylhexanoate), 1,1-di-(t-amyl-peroxy)cyclohexane, 2-(t-butylperoxy)-2-methyl-4-hydroxypentane, di-[2-(t-butylperoxy)-2-methyl-4-pentyl] carbonate, di-[2-(t-butylperoxy)-2-methyl-4-pentyl] terephthalate, di-[2-(t-butylperoxy)-2-methyl-4-pentyl] isophthalate, 4-hydroxy-2-methyl-2-pentyl peroxy-2-methylbenzoate, 4-hydroxy-2-methyl-2-pentyl peroxyacetate, di-t-amylperoxide, 2,2-di-(t-amylperoxy)propane, ethyl 3,3-di-(t-amylperoxy)butyrate, 2,5-dimethyl-2,5-di-(t-amylperoxy)hexane, and OO-t-amyl-O-(2-ethylhexy)-monoperoxycarbonate.

5. The masterbatch composition of claim 1 wherein the organic peroxide is selected from the group consisting of 2,5-dimethyl-2,5-di-(t-butylperoxy)hexane, dicumyl peroxide and 1,1-di-(t-butylperoxy)-3,3,5-trimethylcyclohexane.

6. The masterbatch composition of claim 1 wherein the polycaprolactone has a molecular weight of about 500 to about 100,000.

7. The masterbatch composition of claim 6 wherein the polycaprolactone has a molecular weight of about 10,000 to about 50,000.

8. The masterbatch composition of claim 1 further comprising a peroxide compatible additive selected from the group consisting of inorganic filler, antioxidant, antiozonant, antistatic agent, dye, pigment, optical brightener, heat stabilizer, light stabilizer, fire retardant, cross-linking enhancer and mixtures thereof, the additive being present in an amount which does not result in substantial degradation of the peroxide.

9. The masterbatch composition of claim 8 wherein any additives are present in any ratio and in any amount of about 0.1% to less than 84%, so long as the total amount of peroxide plus additives does not exceed about 95%.

10. The masterbatch composition of claim 9 further comprising a peroxide compatible additive or additives in any ratio and in any amount between about 0.1% and about 74%, so long as the total amount of peroxide plus additives does not exceed about 85%.

11. The masterbatch composition of claim 8 wherein the additive is selected from the group consisting of tetrakis[methylene(3,5-di-t-butyl-4-hydroxyhydrocinnamate)]methane, tris(2,4-di-t-butylphenyl)-phosphite and bis-(2,2,6,6-tetramethyl-4-piperidinyl)-sebacate.

12. The masterbatch composition of claim 1 wherein the organic peroxide is present in an amount of more than 11% to about 50%.

13. The masterbatch composition of claim 1 wherein the organic peroxide is present in an amount of about 12% to about 25%.

14. A method of modifying a polymer comprising adding to the polymer about 0.1% to about 50% of the masterbatch composition of claim 1.

15. The method of claim 14 wherein the polymer is selected from the group consisting of polyethylene, polypropylene, poly(vinyl chloride), poly(vinyl chloride-co-vinylidene chloride), acrylonitrile-butadiene-styrene copolymers, poly(vinyl acetate), nitrocellulose, poly(styrene-co-acrylonitrile), poly(vinyl butyral), poly(vinyl formal), poly(styrene-co-methyl methacrylate), cellulose tridecanoate, poly(ethylene oxide), polycaprolactam, poly(ethyl vinyl ether-co-maleic anhydride), polybutadiene, polyisobutylene, natural gum rubber, poly(styrene-co-butadiene), poly(ethylene-co-propylene) terpolymer, butyl rubber gum, styrene unsaturated polyester, poly(ethyl vinyl ether), epoxy resin and phenol formaldehyde.

16. The method of claim 14 wherein the polymer is polypropylene.

* * * * *